E. & J. JACKSON.
Wood-Working Machine.

No. 216,277. Patented June 10, 1879.

Fig. 1.

E. & J. JACKSON.
Wood-Working Machine.

No. 216,277.  Patented June 10, 1879.

E. & J. JACKSON.
Wood-Working Machine.

No. 216,277. Patented June 10, 1879.

WITNESSES:
W. C. Brookes
Chas. C. Stetson

INVENTORS
John Jackson
Edwin Jackson

E. & J. JACKSON.
Wood-Working Machine.

No. 216,277. Patented June 10, 1879.

Witnesses:
W. C. Brookes
Chas. C. Stetson

Inventors
E. Jackson
John Jackson
by their attorney C. C. Stetson

UNITED STATES PATENT OFFICE.

EDWIN JACKSON, OF BRADFORD, AND JOHN JACKSON, OF LEEDS, COUNTY OF YORK, KINGDOM OF GREAT BRITAIN AND IRELAND.

IMPROVEMENT IN WOOD-WORKING MACHINES.

Specification forming part of Letters Patent No. 216,277, dated June 10, 1879; application filed August 20, 1878; patented in England, January 31, 1878.

*To all whom it may concern:*

Be it known that we, EDWIN JACKSON, of Bradford, and JOHN JACKSON, of Leeds, both in the county of York, Kingdom of Great Britain and Ireland, have invented new and useful Improved Wood-Working Machinery, of which the following is a specification, whereof the accompanying drawings form parts.

Referring to these drawings, Figure 1, Sheet 1, is a front elevation, showing the general arrangement of a wood-working machine according to our invention. Figs. 13 to 21, inclusive, are additional detailed views of the apparatus shown in Figs. 4, 5, and 6.

1 is the principal frame-work of the machine. 2 is a sliding bracket, (under the table,) and carries a circular-saw spindle, 3. This bracket 2 is made to rise and fall, in an ordinary way, by the hand-wheel 4, gearing 5, and screw 6. 7 is an adjustable fence, provided for square and bevel cutting. The saw-spindle is driven in the usual way.

Near to one end of the table a vertical spindle, 8, is mounted in bearings in a slide, 9, which is capable of vertical adjustment by means of the hand-wheel 10, gearing 11, and screw 12. The motion is such as to allow of the upper end of the spindle 8 being lowered clear of the top of the table.

At the back of the machine and on the table is fixed a pillar, 13, upon which is mounted the radial arm or bed 14, which is free to turn horizontally thereon to any angle required. Upon the arm or bed 14 is mounted a compound slide composed of two slides, 15 and 16. The slide 16 carries in suitable bearings a vertical spindle, 17, which is capable of adjustment horizontally by the screw 18, moving the compound slide, and vertically by the hand-wheel 19 and screw 20, moving the slide 16. Upon the upper end of the spindle 8, and upon the lower end of the spindle 17, cutters are mounted suitable for the various kinds of work to be performed.

The driving-shaft 21, from which motion is given to the spindles 8 and 17, passes through the pillar 13, and is carried by it and the foot-step 22.

The spindle 17 receives motion by a band or strap from the pulley 23, and the spindle 8 receives motion by another band or strap from the pulley 24, the pulley 25 being a loose one.

Mortising is done by a revolving cutter or bit fixed in the spindle 17, which is turned round on the pillar 13 to the required position.

A bracket, 26, is attached to the back of the principal framing 1, which bracket is provided with a suitable sliding table, 27. A griping-cramp, 27$^a$, receives and holds the part to be operated upon.

The sliding table 27 receives reciprocating motion from the crank 28, which is driven from the pulley 29 on the vertical driving-shaft 21 through the pulley 30 on the crank-shaft, the length of crank-stroke being adjustable to the length of mortise required. The mortises thus formed are round at the ends.

The squaring and molding of quarter-turns and wreaths of hand-rails are effected by aid of the apparatus represented by the parts 31, 32, 33, 34, 35, and 36 in Figs. 4, 5, and 6, and Figs. 13 to 19, inclusive, and partly also in Figs. 20 and 21.

The stock 31, fixed to the side of the principal frame-work 1 of the machine, is pierced to receive the vertical rod 32. This rod at all times represents the center of the well-hole of a staircase.

The cutter on the end of the spindle 17 is so adjusted in position by means of the radial arm or bed 14 and slide 15 that the cutter's periphery represents the radius of the required well-hole.

To the vertical rod 32 a horizontal rod or bar, 33, is fixed, as shown, and on it the cramp or bed-plate 34 is secured to the required pitch of the wreath. The wreath-piece being fixed in the cramp 34 on the horizontal rod or bar 33, and being also brought to a position corresponding with the radius of the required well-hole from the axis 32, the tool or cutter in the spindle 17 is then brought over the wreath-piece to the point where the cut is required to be made, and also to the required depth. Then, by moving the apparatus that is carried by the rod 32 horizontally round the axis of that rod, a cut is made which forms a perfect segment of a circle, thus squaring the inside surface of the wreath. To square the outside surface of the wreath, the slide 15 is moved horizontally on the radial arm or bed 14 a distance equal to the breadth of the required wreath or rail plus the diameter of the cutter. The operation of moving the apparatus around the axis 32 being then repeated, the wreath-piece is so squared quite truly on both its inside and outside surfaces.

To square the top and the under side and to give the required twist to the wreath or rail, another rod or bar, 35, is placed horizontally above and at right angles to the rod or bar 33. The cramp or bed-plate 34 is now fixed on the rod or bar 35, so that the line forming the top side of the wreath is perpendicular when the tool is brought down to the depth required, and circular vertical motion is given to the wreath and a horizontal traverse on the rod or bar 33 at right angles, the previously-formed side surface of the wreath being always kept close up to the guide 36. The upper surface then becomes perfectly shaped. The same operation being repeated for the bottom side, the wreath then becomes a portion of a helical coil whose cross-section is rectangular.

To produce the molding on the wreath the same motion is used; but the tool used must be a counterpart to that of the molding required.

Figure 13:
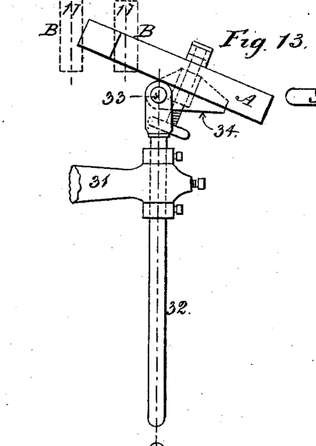
Figures 14, 16, 18:
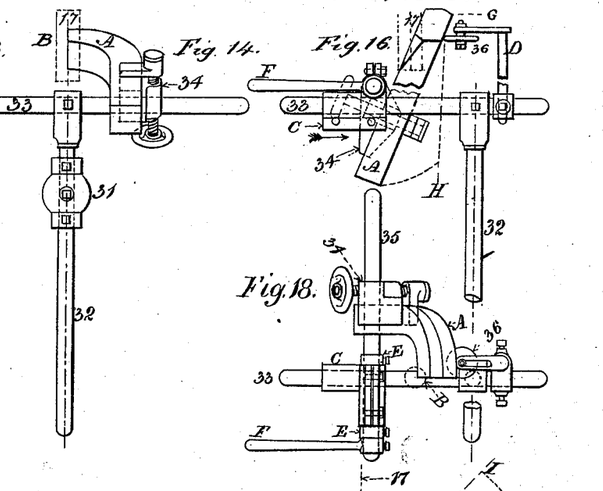
Figure 15:
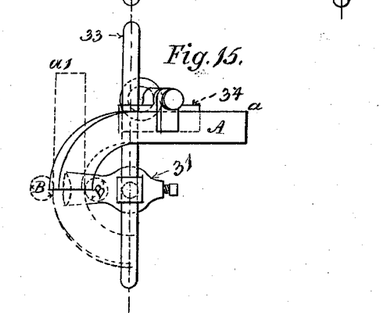

The following will serve to more fully explain the manner of operation, reference being had to Figs. 13 to 21:

Upon the rod 33, Figs. 13 and 14, the cramp or bed 34, for holding the wreath or quarter-turn, is fixed. In performing the first operation on the wreath or quarter-turn A, (which is first roughly cut out to the required figure in blank,) it is securely fixed in the cramp or bed 34, in such position that the center of its circular part is represented by the vertical rod 32, and at the same time is placed at such an angle as to represent the required pitch of the same. The cutter B on the spindle 17 is so placed in position, by means of the radial arm or bed 14 and slide 15, that its periphery represents inside radius of the wreath or quarter-turn of the hand-rail. The apparatus is then caused to make about one-fourth of a revolution, by the operator, on the vertical axis of the rod 32, so that the wreath or quarter-turn is moved from the position shown by the full lines $a$, Fig. 15, to that shown by the dotted lines $a'$—in other words, through an arc of about ninety degrees—the action of the cutter B thus forming the inside twist required. The outside twist is formed in a similar manner, the cutter B being moved farther away from the center of the rod 32, thus completing the first and second operations.

Figure 17:
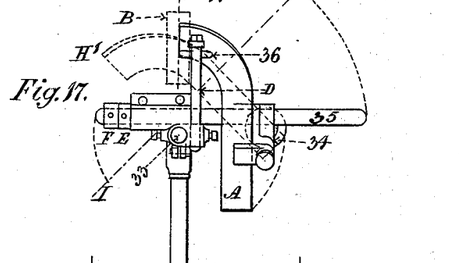
Figure 19:
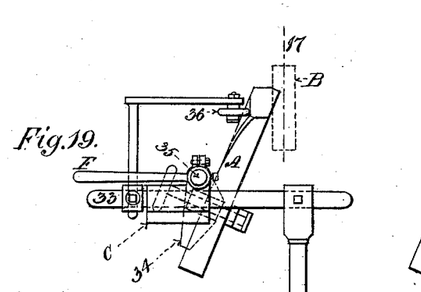

The third operation is shown in Figs. 16, 17, and 18—viz., the shaping of the top or one side of the wreath or quarter-turn. In this operation the vertical rod 32 is fixed in the stock or pillar 31, and another rod, 35, is placed horizontally and at right angles to the rod 33, being mounted in a suitable carriage, C, upon the rod 33. The cramp or bed 34 is now placed upon the rod 35, and the wreath-piece or quarter-turn fixed therein. On the rod 33, which is now fixed in its bearing, is fixed the carriage D and guide-roller 36. The rod 35 has an angular or axial motion in the carriage C, effected by the operator by means of the handle F, being meantime kept from moving endwise by the adjustable collars E E. At the same time the carriage C has an endwise, as well as an axial, motion on the rod 33 in the direction shown by the arrow, Fig. 16. During these axial or angular and endwise motions the plain side G of the wreath or quarter-turn is pressed against the guide-roller 36 until, at the end of the operation, it reaches the position shown by the dotted lines H H', Figs. 16 and 17, and the rod 35 is brought to the position shown by the dotted line I I, Fig. 17, the action of the cutter thus forming the twist on the top or one side of the wreath or quarter-turn, and completing the third operation.

The fourth operation is that of forming the corresponding twist on the opposite side. The last-formed side now becomes the guide for the other side, by being pressed against the guide-roller 36, Fig. 19, the action of the cutter forming the required twist, similar motions being used as in the third operation, thus completing the fourth operation.

The fifth operation, Fig. 20—that of shaping a portion of the top and also a portion of the side molding—is performed on the last-named apparatus, and having precisely similar motions and guide as used in the third and fourth operations; but the center of the wreath or quarter-turn is required to be placed in a concentric position with the rod 33, which is its center of motion in this case.

The sixth operation, Fig. 21, is performed in a similar manner to operation No. 5, the cutter L being substituted for that of K.

The seventh and final operation—of shaping the remaining half of the top and the molding on the inside of the turn—is performed by hand.

To cut spiral moldings, the material to be operated upon is placed between centers or bearings in suitable head-stocks 37 and 38 on the bracket 26. The radial arm or bed 14 is swiveled round, fixed over the head-stocks, and secured in a position parallel therewith, so that the axis of the cutter-spindle forms a radial line with the object to be operated upon.

Change-wheels are provided between the head-stock 37 and the screw 18, so that various pitches of spirals may be cut, as follows:

Motion is given to the screw 18, a longitudinal traverse is imparted to the cutter-slides 15 and 16 along the radial arm or bed 14, and, by means of the change-gear, an angular circular or axial motion is given to the object intended to be cut, thereby producing the spiral required. Taper spirals may also be cut by raising or lowering the center of the head-stock 38, so that the axis of the object forms an angle with the radial arm or bed 14.

Plain taper objects may also be shaped by this apparatus.

For tenoning, the cutter-spindle 17 may be brought directly over the bottom spindle, 8, and the cutter so arranged and formed to cut shoulders of equal or unequal length, and form the said shoulders either square or undercut, or otherwise, as may be desired, a suitable carriage, 39, being provided on which to mount the material to be operated upon, the said carriage being moved by hand.

For cutting moldings, the upper spindle, 17, with its cutter, is capable of being moved to any required position to cut one side, while the lower spindle and cutter may be used to cut the other.

For trenching, the material being suitably fixed on table, and the upper spindle and cutter being traveled along by means of screw 18, either square or angular work may be produced.

The operations of grooving and rabbeting resemble the operation of molding.

Figure 1:
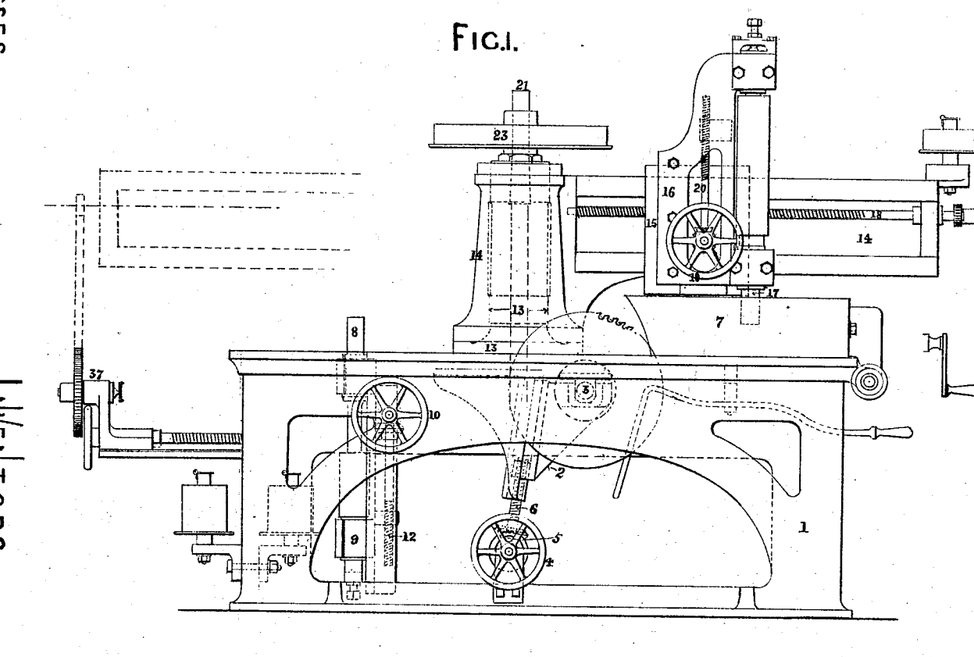
Figures 2, 8:
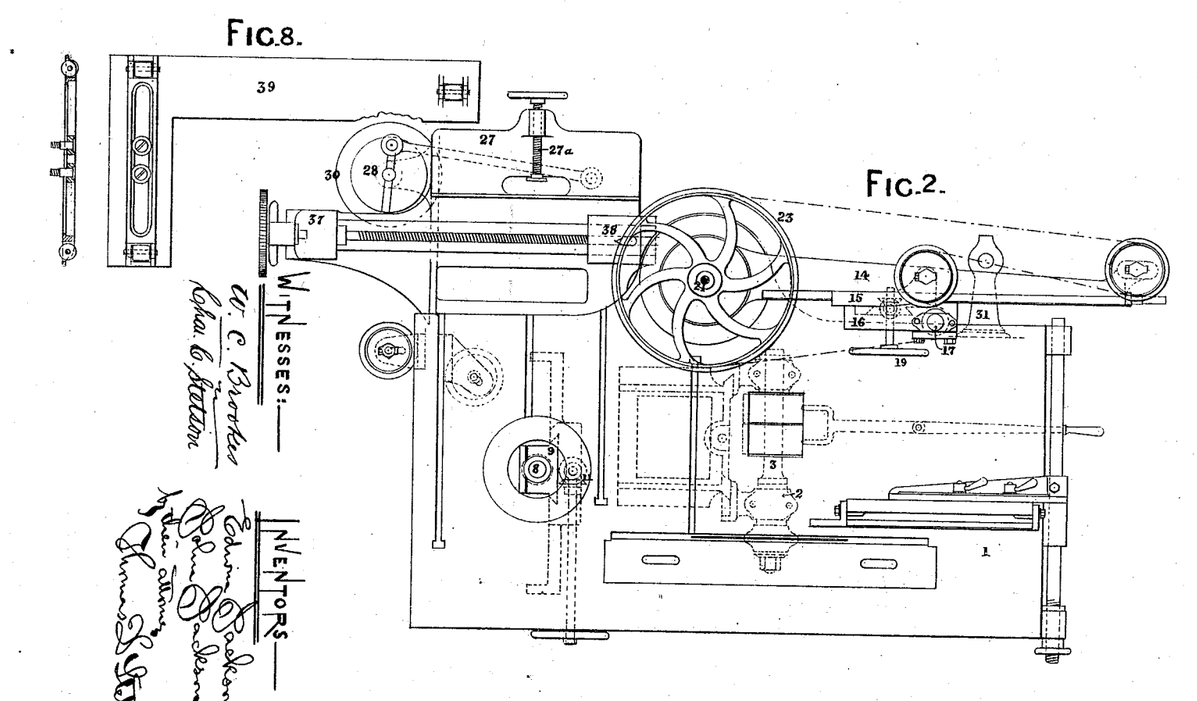
Fig. 2 is a plan of the machine.
Fig. 8 is a movable tenoning-carriage.
Figures 3, 4, 5:
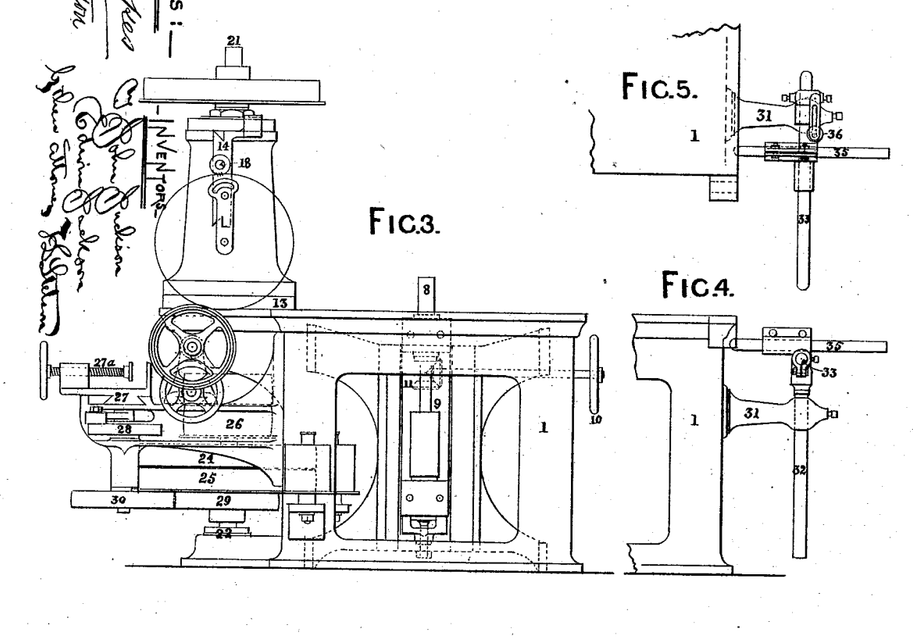
Fig. 3 is an end elevation thereof.
Figs. 4, 5, and 6 are various detached details for working quarter-turns and wreaths of hand-rails.
Figure 6:
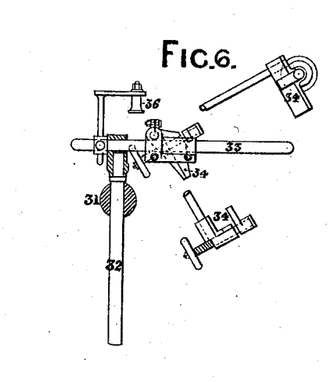
Figure 7:
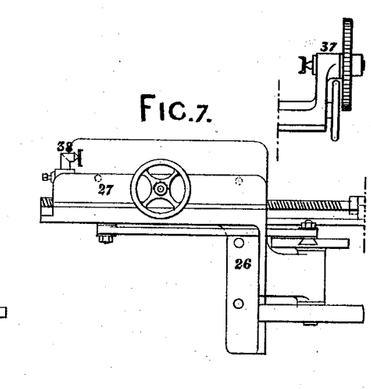
Fig. 7 is a front view of bracket for boring and mortising.
Figure 9:
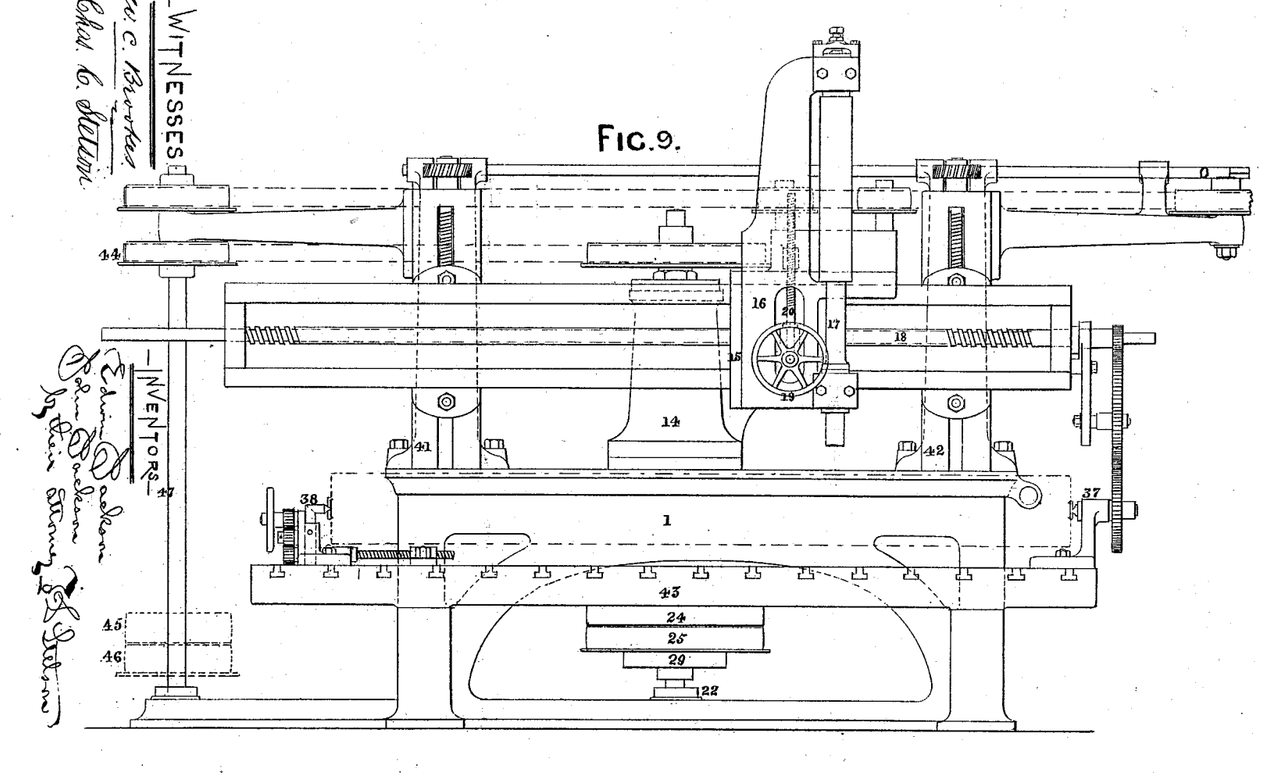
Figs. 9, 10, 11 represent views of the machine slightly modified, Fig. 12 being a detailed view.
Figure 10:
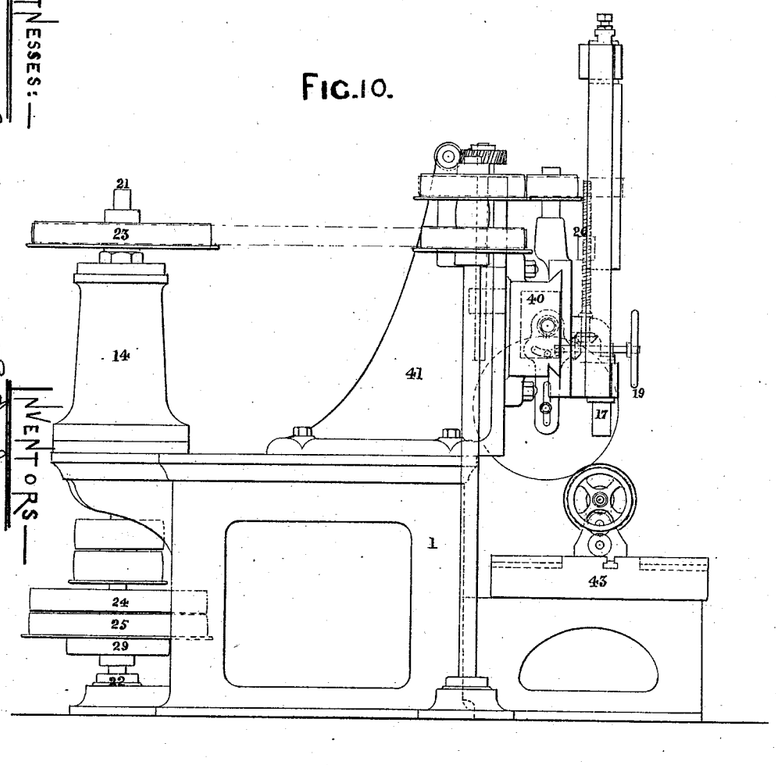
Figure 11:
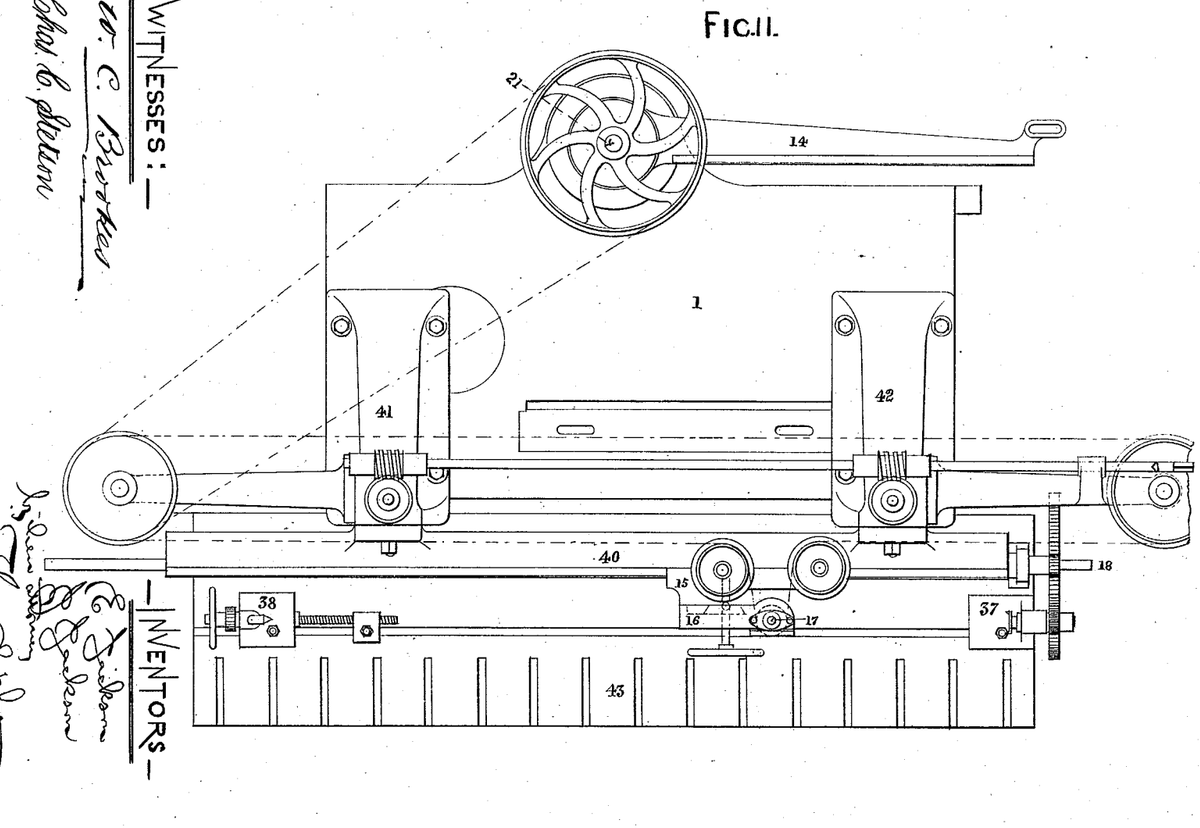

When longer objects—for instance, ships' masts—than can be admitted between the centers of the above-described machine are required to be cut, the construction of the machine may be modified, as shown in Figs. 9, 10, and 11, whereof Fig. 9 is a front elevation, showing the general arrangement of the machine. Fig. 10 is an end elevation thereof. Fig. 11 is a plan of the same. In this arrangement we use a long slide or bed for carrying the cutter-spindle 17, and similar slides (forming a compound slide) to those shown on the radial arm or bed 14, described with reference to the preceding arrangement. The long slide or bed 40 is placed on the faces of uprights or standards 41 and 42, arranged on the top of the principal frame-work 1 of the machine, and is capable of being raised or lowered by a suitable arrangement of gearing and screws, as shown in Figs. 9, 10, and 11; or, if preferred, the principal frame-work 1 may be dispensed with, and the uprights or standards 41 and 42 be carried down to the floor, or a suitable foundation, and secured thereto, the bases of said standards or uprights being made to project forward, so as to have the fixed table 43 mounted thereon. In this latter arrangement the vertical driving-shaft 21 and the pulley 44 may also be dispensed with, and the driving-pulleys 45 and 46 (shown in dots) on the vertical shaft 47, Fig. 9, substituted therefor.

Figure 12:
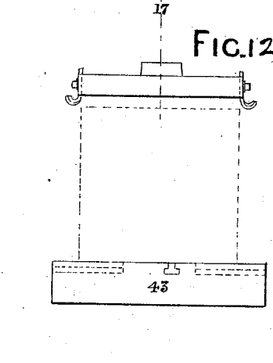

A table, 43, of any suitable length, may be fixed under the spindle 17, upon which may be mounted a pair of head-stocks, 37 and 38, similarly arranged to those hereinbefore described and for similar purposes, and having the same reference-numbers marked thereon. The present arrangement of long slide or bed 40 and table 43 may be used for squaring or truing or trying up large scantlings of timber, as shown in Fig. 12; and by the cutter-spindle and disk traveling in place of the wood having the usual motion, considerable saving of room may be effected in working this class of machine over the ordinary ones in use.

For tenoning, the material to be operated upon is fixed upon the table 43 by a suitable fence and holding apparatus. Such fence and holding apparatus have a horizontal swiveling or angular motion, in order that tenons may be cut having either right or any desired angle. The spindle 17 and suitable cutters mounted thereon are traversed past the material by means of the screw 18 in the long slide 40. The lengths and forms of the shoulders are provided for by the diameters and configurations of the cutters.

For cutting moldings, the material is fixed to the table in proper position by suitable holding apparatus, and the spindle 17, with the desired shape of molding, is traversed on the long slide 40 by the screw 18, as in the tenoning operation.

For trenching, the material is suitably fixed on the table, and the spindle, with cutter, is traversed, as above described.

The operations of grooving and rabbeting are performed similarly to the molding operation.

We claim—

1. In combination with the framing 1 and driving-shaft, an adjustable bed carrying the slides 15 and 16 and spindle 17, substantially as set forth.

2. The combination, with the table, of the pillar 13, shaft 21, pulley 23, radial arm or bed 14, (capable of turning about said pillar,) slides 15 and 16, spindle 17, and adjusting-screws 18 and 20, all arranged and operating substantially as described and shown.

3. In combination with an adjustable bed carrying the slides 15 and 16 and spindle 17, the bracket 26, (attached to the framing 1,) with its sliding table 27, means for actuating the same, and the griping-cramp, all arranged and operating substantially as described and shown, for the purpose specified.

4. In combination with the main frame 1, and an adjustable bed carrying the slides 15 and 16 and spindle 17, the stock 31, vertical rod 32, horizontal rod or bar 33, cramp or bed-plate 34, rod or bar 35, and guide 36, all constructed, arranged, and operating substantially as described and shown, for the purposes specified.

5. In combination with the main frame 1, and an adjustable bed carrying slides 15 and 16 and spindle 17, the bracket 26, with its head-stocks 37 and 38 and their centers, the head-stock 37 being geared with the screw 18, substantially as described, for the purposes specified.

6. The combination, with the radial arm or bed 14, carrying slides 15 and 16 and spindle 17, of the spindle 8, slide 9, and means for adjusting, substantially as described.

7. The herein-described compound wood-working machine, composed of, first, the main frame 1 and its table; second, the spindle 8 and means for operating it; third, the head-stocks 37 and 38, with their centers and operating means; fourth, the radial arm or bed 14, carrying the slides 15 and 16 and spindle 17, substantially as set forth.

8. A wood-working machine composed of the main frame 1 and its table, the cramp or bed-plate 34, with its supporting and adjusting means, the spindle 8, with its operating and adjusting mechanism, the head-stocks 37 and 38, with their centers and means for operating the same, and a radial arm or bed, 14, carrying the spindle 17 and its operating and adjusting mechanism, the several parts being relatively arranged as described, so that the spindle 17, by turning the radial arm and adjusting the said spindle thereon, may be made to co-operate with the aforesaid mechanism, for the purposes substantially as specified.

9. In combination with the framing 1, driving-shaft 21, and other parts, the slide 40, adjustable on the uprights or standards 41 and 42, and carrying the slides 15 and 16 and spindle 17, substantially as described and shown.

EDWIN JACKSON.
JOHN JACKSON.

Witnesses:
    WILLIAM VEVERS,
    GEO. F. HAINSWORTH,
*Clerks to Mr. Thomas Greenwood Teale,*
        *Notary Public, Leeds.*